United States Patent [19]

Tobias et al.

[11] 4,140,819

[45] Feb. 20, 1979

[54] FAST-CURING COATING COMPOSITIONS

[75] Inventors: Michael A. Tobias, Bridgewater; Conrad L. Lynch, Edison, both of N.J.

[73] Assignee: Mobil Oil Corporation, New York, N.Y.

[21] Appl. No.: 888,114

[22] Filed: Mar. 20, 1978

Related U.S. Application Data

[62] Division of Ser. No. 739,386, Nov. 5, 1976, Pat. No. 4,102,869.

[51] Int. Cl.$^2$ .......................... B05D 3/02; B05D 3/12
[52] U.S. Cl. ..................................... 427/178; 427/379; 427/386; 427/388 A; 427/388 D
[58] Field of Search ............ 260/29.2 E, 75 EP, 75 T, 260/835, 850; 427/379, 386, 388 A, 388 D, 178

[56] References Cited

U.S. PATENT DOCUMENTS

| | | | |
|---|---|---|---|
| 3,491,066 | 1/1970 | Petropoulos | 260/75 T |
| 3,657,191 | 4/1972 | Titzmann et al. | 260/75 T |
| 4,016,142 | 4/1977 | Alexander et al. | 260/75 T |

*Primary Examiner*—Michael R. Lusignan
*Attorney, Agent, or Firm*—Charles A. Huggett; Vincent J. Frilette

[57] ABSTRACT

Linear polyester resins, terminated with carboxyl groups, and suitable for inclusion in heat-curable fluid coating compositions, are advantageously modified by capping a minor fraction of the carboxyl groups with a hydrocarbyl glycidyl ether. The capped resins produce water-reducible formulations that exhibit a fast curing rate and excellent adhesion when formulated with hexamethoxymethylmelamine, for example. Such fluid coating compositions may be used as industrial coatings and coil-coatings.

3 Claims, No Drawings

FAST-CURING COATING COMPOSITIONS

This is a division of copending application Ser. No. 739,386, filed Nov. 5, 1976, now U.S. Pat. No. 4,102,869, patented July 25, 1978.

BACKGROUND OF THE INVENTION

1. Field of the Invention

This invention is concerned with a process for producing heat-curable, modified linear polyester resins. In particular, it is concerned with fluid coating compositions that are water-reducible. In another aspect, this invention is concerned with water-reducible fluid coating compositions suitable for coil-coating, and with the process in which such compositions are used for coating coils of metal.

2. Prior Art

Protective and decorative coatings are commonly applied to industrial products, such as appliances, automobiles, furniture, and sheet metal products. In most of these cases, the coating is applied as a fluid coating composition containing an organic solvent which is evaporated and discharged to the atmosphere.

The term "coating" as used herein is intended to mean the deposit produced in the coating process, and includes: the wet coating as initially deposited, including solvent; the dried coating substantially free of solvent; and the cured coating. The context will usually make clear whether wet coating, dried coating or cured coating is intended when the term "coating" is used without qualification. The term "fluid coating composition" is to be understood to mean a fluid composition useful in a coating process. The composition may require the addition of auxiliary materials prior to application. These auxiliary materials may include amounts of one or more of an organic solvent, water, a cross-linking agent, and a catalyst, said amounts being dictated by the requirements of the process.

Since a large portion of industrial finishes are heat-cured, evaporation often takes place inside of baking ovens, involving heating elements. With few exceptions, the organic solvents used are flammable, and their use requires that considerable precaution be taken to avoid fire or explosion. Many of the solvents are toxic at least to some degree. Because of the very large volume of industrial coatings that are used, discharge of the solvent vapors into the atmosphere represents an undesirable situation from an ecological point of view. Thus, industry has been seeking new types of coating systems which eliminate the use of solvent, or which use water as part or all of the solvent system. Example 7, U.S. Pat. No. 3,491,066, issued Jan. 20, 1970, illustrates one such water-reducible system.

It has become common practice in the fabrication of thin sheet metal products such as rain gutters, down spouts, and siding for houses, to apply the coating to the metal prior to forming the final product. In this practice, a coil of the sheet metal is fed, as more fully described hereinbelow, through a coating machine where the fluid coating composition is applied, the solvent evaporated, and the dried coating cured. The metal with the cured coating is picked up by a take-up roller where it is again formed into a coil before fabrication. This process will be referred to herein as "coil-coating." Formulation of coatings suitable for coil-coating must satisfy some stringent requirements. Generally, it is required that the coating cure fully in less than about 2 minutes, for example 40 seconds, compared with about 15 minutes for industrial coatings for refrigerators, for example. Thus, they must be fast curing. Also, they must be very adherent and flexible, so that the bond between the coating and the metal is maintained during the subsequent forming operation, which often involves making sharp bends, as in the manufacture of rain gutters.

The common currently used coil-coatings are formulated with linear polyester resins prepared with excess glycol. These hydroxyl-terminated resins are not water-reducible. Preparation of such resins with excess dibasic acid instead of excess glycol results in carboxyl-terminated polyester resins, which can be made water-reducible by the addition of amines, as is known in the art. However, such materials have not proved suitable for use in coil-coating, for example, because the reaction with the commonly added cross-linking agent, hexamethoxymethylmelamine, is not adequately fast.

BRIEF SUMMARY OF THE INVENTION

It has now been discovered that an improved water-reducible resin is prepared by reacting a preformed carboxyl-terminated linear polyester resin with a hydrocarbyl glycidyl ether of the formula

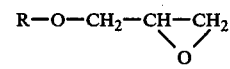

wherein R is a hydrocarbon substituent having up to 18 carbon atoms. Fluid coating compositions comprising the improved resins and a curing agent such as hexamethoxymethylmelamine and a catalyst such as paratoluene sulfonic acid, as more fully described hereinafter, cure rapidly to form highly adherent and flexible coatings. Such fluid coating compositions are suitable for coil-coating.

It is an object of this invention to provide a process for preparing an improved water-reducible resin. It is a further object of this invention to provide a water-reducible fluid coating composition comprising the reaction product of a hydrocarbyl glycidyl ether with a carboxyl-terminated linear polyester resin. It is a further object of this invention to provide an improved process for coil-coating of metals wherein a water-reducible, fast-curing fluid coating composition is applied.

DETAILED DESCRIPTION OF THE INVENTION

The preformed carboxyl-terminated linear polyester resins useful in this invention are well-known in the art. They are the products of the condensation of a diol with a dicarboxylic acid, the latter being charged to the reaction mixture in the ratio of about 1.02 to about 1.20 mol per mol of diol. One may use any dicarboxylic acid including α, β-ethylenically unsaturated dicarboxylic acids and/or those dicarboxylic acids free of non-benzenoid unsaturation. Among the dicarboxylic acids free of non-benzenoid unsaturation which may be used in the practice of the present invention are the phthalic acids such as ortho, iso and terephthalic acids as well as halogen-substituted phthalic acids such as tetrachlorophthalic anhydride, oxalic acid, malonic acid, succinic acid, glutaric acid, sebacic acid, adipic acid, pimelic acid, suberic acid, azelaic acid, tartaric acid, malic acid, and the like. Among the α, β-ethlenically unsaturated dicarboxylic acids which may be used in the practice of the present invention are maleic acid, fumaric acid, itaconic acid, citraconic acid, chloromaleic acid, chlorofumaric acid, and the like. Whenever available, the anhydrides of these acids may be used. These acids or their anhydrides may be used either singly or in combination with one another.

The diols useful in the preparation of the preformed carboxyl-terminated linear polyester resins include but are not restricted to ethylene glycol, diethylene glycol, triethylene glycol, 1,2-propylene glycol, 1,3-propylene glycol, the butylene glycols, neopentyl glycol, hexamethylene glycol, 2,2,4-trimethyl-1,3-pentanediol, 1,4-cyclohexane dimethanol and 2,2-dimethyl-3-hydroxypropyl-2,2-dimethyl-3-hydroxypropionate. This last material is sold commercially by Union Carbide Corporation as Ester Diol 204.

Also useful in the preparation of the preformed carboxyl-terminated linear polyesters useful in this invention are hydroxyacids, such as hydroxyacetic acid, hydroxypropionic acid, and 6-hydroxy hexanoic acid, provided they are used in conjunction with adequate debasic acid to insure carboxyl termination of the preformed linear polyester resin.

In general, the condensation of the dicarboxylic acid and the glycol is conducted, in one or more stages, at a temperature from about 200° C. to about 240° C., with removal of water until the evolution of water ceases. At this point the resin usually has an alcoholic acid number of less than about 100 mg KOH per gram of resin.

The preformed carboxyl-terminated linear polyester resins prepared as described above may, of course, be rendered water-reducible by neutralizing the resins with a wide variety of amines, as is well recognized in the art. However, the fluid coating compositions based on such amine-neutralized resinous compounds, when formulated with hexamethoxymethylmelamine as crosslinking agent, produce coatings that cure slowly. In fact, it has not been found possible with such compositions to achieve adequate mar resistance and cure at a temperature of 375° F. to 475° F. in the less than 2 minutes time required for coil-coating.

Surprisingly, it has been found that by reacting the preformed carboxyl-terminated linear polyester resin with an amount of a hydrocarbyl glycidyl ether sufficient to react with up to about 49% of the carboxyl groups, a modified linear polyester resin is formed which is particularly suited for formulation into a water-reducible, heat-curable coating in which the curing rate is remarkably enhanced. Furthermore, when this modified linear polyester resin is formulated into a coil-coating, it is found that not only is the curing time very short but the coating exhibits excellent adhesion, allowing for post-forming operations which do not disrupt the coating, as will be more fully described hereinafter.

The reaction of the preformed carboxyl-terminated linear polyester resin with the hydrocarbyl glycidyl ether is conducted at substantially lower temperature than that employed in forming the polyester resin. Temperatures of 50° C. up to 170° C. may be used, but the preferred temperatures are in the range of 75° C. to 150° C. This reaction with the hydrocarbyl glycidyl ether is conducted substantially without the elimination of water, and according to the equation:

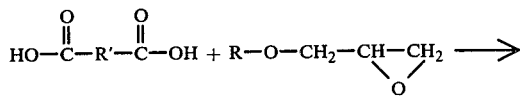

wherein

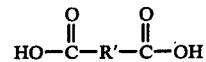

is the preformed carboxyl-terminated linear polyester, R' representing the esterified chain formed by reaction of any of the above-described dibasic acids and glycols, wherein R is a hydrocarbon substituent having up to eighteen carbon atoms, and wherein one mol equivalent of glycidyl ether reacts with one mol equivalent of carboxyl groups. Reaction times of 15 minutes to 5 hours may be employed, depending on the particular constituents employed in the reaction and the chosen temperature. In any case, reaction conditions should be chosen such that most of the glycidyl ether is consumed but without inducing further elimination of water. Such a reaction is conveniently referred to as "capping" and the linear polyester resin that results from this reaction is referred to herein as a capped linear polyester resin. The precise amount of hydrocarbyl glycidyl ether employed will depend on the particular preformed linear polyester resin employed as well as the objective to be achieved. In general, sufficient hydrocarbyl glycidyl ether should be used to cap, i.e., to react in the hereinabove described manner, with at least 5% of said terminal carboxyl groups. This amount of capping will produce a marked increase in the curing rate, that is, a decrease in the curing time. For the purposes of this invention, it is preferred to cap from 10% to 35% of the terminal carboxyl groups, since this amount is ordinarily sufficient to decrease the curing time to less than 2 minutes at a temperature of 375° F. to 475° F.

The hydrocarbyl glycidyl ethers useful in the present invention are those having the chemical formula

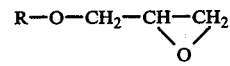

wherein R is a hydrocarbyl group having up to 18 carbon atoms. The hydrocarbyl group R is alkyl, aryl, or alkaryl. Specific hydrocarbyl glycidyl ethers in which R is an n-alkyl group are methyl glycidyl ether, ethyl glycidyl ether, n-propyl glycidyl ether, n-butyl glycidyl ether, n-pentyl glycidyl ether, and n-hexyl glycidyl ether. Of the latter group, n-butyl glycidyl ether is preferred. Aryl glycidyl ethers such as phenyl glycidyl ether, tolyl glycidyl ether and xylyl glycidyl ether are useful. Phenyl glycidyl ether is preferred. Aralkyl glycidyl ethers such as benzyl glycidyl ether and phenylethyl glycidyl ether also are useful.

The capped linear polyester resins hereinabove described are water-reducible in the presence of amine, such as N,N-Dimethylethanolamine, when the amine is present in an amount sufficient to substantially neutralize the free carboxyl groups. Depending on the particular capped linear polyester resin employed, a greater or lesser amount of an organic cosolvent is advantageously used in formulating fluid coating compositions containing the capped resins. Proportions of from about 10 parts to about 40 parts of cosolvent per 100 parts of capped resin are suitable. Cosolvents may be selected from water-soluble organic compounds such as isopropanol, tertiary butyl alcohol, butanol, cellosolve, methyl cellosolve, butyl cellosolve, carbitol, methyl carbitol, butyl carbitol, and the like. In some instances no cosolvent may be required to form a homogeneous, clear vehicle when the capped resin is let down with water and amine. Usually, however, some cosolvent is advantageous, in which case it is blended with the resin preferably before adding water. The fluid coating composition comprising the capped polyester resin of this invention preferably contains, when ready to apply, an amount by weight of water at least equal to the amount of cosolvent, and it may contain a solvent composition of about 80 parts by weight of water and 20 parts of cosolvent, or more, as hereinbelow illustrated. Obviously, such solvent compositions offer substantial advantage, compared with nonaqueous solvents, with regard to both fire-hazard and air pollution.

The capped linear polyester resin made according to the process of the present invention will be used in fluid coating compositions in which a cross-linking agent such as hexamethoxymethylmelamine is present. This cross-linking agent is well known in the art and its preparation is shown in U.S. Pat. Nos. 2,918,452, 2,998,410 and 2,998,411, the contents of which are incorporated herein by reference. For the purposes of this invention, cross-linking agents other than hexamethoxymethylmelamine may be used. For example, a hexamethoxymethylmelamine type of compound, but in which 12 to 13 percent of the substituents left as free —$CH_2OH$ groups, may be used. Such compounds have increased reactivity and, unlike the fully methylated compound, may be used as cross-linking agents without the addition of an acid catalyst. In general, for the purposes of this invention, any water-soluble urea-formaldehyde, melamine-formaldehyde, or benzoguanamine-formaldehyde condensation product is potentially useful provided the particular condensation product exhibits adequately fast cure. Hexamethoxymethylelamine is preferred.

The amount of the cross-linking agent used in the ultimate coating composition that contains the capped polyester resin produced by the process of the present invention may be varied between about 5% and 40%, by weight, of the capped polyester, the particular amount chosen being effective to cross-link and impart the desired degree of mar resistance and hardness to the baked coating. In all cases, at least some cross-linking must be achieved in order to experience the enhanced properties of a mar-resistant, weather-resistant film which the use of the product of the present process provides.

The water-reducible, heat-curable fluid coating composition of this invention is preferably formulated with the hereinabove described capped linear polyester resin which, together with cross-linking agent, constitutes the sole resinous component. The fluid coating compositions may be clear or pigmented with the usual pigments employed in paint manufacture. A typical white paint type of fluid coating composition may contain from 20 wt. percent to 70 wt. percent total solids, with a pigment to binder ratio of about one to one. The water-reducible, heat-curable fluid coating composition of this invention may be applied by any conventional method including dipping, roller-coating and spray-coating. It is particularly useful, as hereinabove indicated, for coil-coating.

The coil-coating process, as presently known, accepts a coil of sheet metal, the metal being usually aluminum, steel, galvanized steel, or tinplate. The coils commonly contain 20,000 to 40,000 pounds of metal, and are usually from 40 to 60 inches wide. The metal is uncoiled, passed through a cleaning process to remove oil and other foreign matter, and then passed through a chemical treatment operation to render the metal surface more corrosion-resistant and/or more adherent to coatings. The metal so prepared is then passed through the coater section of the apparatus, in which the coating is applied, usually by a roller. The coated metal is then passed to a baking oven, which may have up to four zones of progressively increasing temperature, to thoroughly dry and cure the coating. In the last and highest temperature zone, the metal is commonly brought to a temperature of 375° F. to 475° F. This maximum temperature is commonly called the "peak temperature." In the coil-coating process, all of the described steps are "in-line" and the metal is passed from one step to the next at a linear velocity of from about 50 feet per minute to 500 feet per minute, but more commonly at 250 feet per minute to 350 feet per minute, through the various stages of the process. In general, the time the coated metal is in the oven is less than about 2 minutes, and the curing of the coating generally occurs in the hottest zone of the oven, at which time the metal reaches its peak temperature of 375° F. to 475° F. On emerging from the curing zone, the coated metal is quenched with a water-spray and passed to a takeup roll where it is re-rolled. Utilizing the water-reducible, heat-curable fluid coating composition hereinabove described in the coil-coating process advantageously reduces the risk of fire and minimizes or eliminates the pollution problems associated with common organic solvent-based coatings.

In order that the concept of the present invention may be more completely understood, the following examples are set forth in which all parts or percentages are parts or percentages by weight unless otherwise indicated. These examples are set forth primarily for the purpose of illustration and any specific enumeration of detail contained therein should not be interpreted as a limitation on the invention except as is indicated in the appended claims.

EXAMPLES

Example 1

A 3-liter four-necked round bottom flask equipped with a glass stirring shaft and blade, a steam jacketed take off condenser and distillation head, and thermometer with thermowatch device was charged with 160.0g of neopentyl glycol and 314.0g of Ester Diol 204. The glycol mixture was heated to a melt whereupon 400.0g of isophthalic acid and 1.0g of dibutyl tin oxide were added. This mixture was heated to 205° C. and held there, while removing water, until an alcoholic acid number of 45.2 was obtained. The contents of the flask were cooled to 180° C. and 160.0g of adipic acid were added. The reaction mixture was heated to 235° C. and held there, while removing water, until an alcoholic acid number of 69.1 was obtained. The contents of the flask were cooled to 150° C. and 30.0g of xylene were added. A Dean-Stark trap was placed at the top of the packed column and the contents of the flask returned to 230° C. This temperature was maintained, while removing water, until an alcoholic acid number of 61.1 was obtained. The contents of the flask were cooled to 150° C. and 30.0g of phenyl glycidyl ether and 2.5g of tri-n-butylamine were added. The reaction mixture was held at 150° C. for 1.5 hours. The polyester was reduced with n-butanol to afford a material with a Gardner-Holdt viscosity of Z1-Z2 at 74.2% NVM (2 hours at 150° C) and an alcoholic acid number of 50.6 (on % NVM). A portion of said polyester, i.e., 675.0g, was reduced 36.2g of N,N-Dimethylethanolamine and 290.5g of distilled water to afford a clear solution having a Gardner-Holdt viscosity of Y-Z at 50.6% NVM (2 hrs. at 150° C) and a pH of 7.3.

EXAMPLE 2

A 3-liter four-necked round bottom flask equipped with a glass stirring shaft and blade, a steam jacketed take off condenser and distillation head, and thermometer with thermowatch device was charged with 160.0g of neopentyl glycol and 314.0g of Ester Diol 204. The glycol mixture was heated to a melt whereupon 400.0g of isophthalic acid and 1.0g of dibutyl tin oxide were added. This mixture was heated to 205° C. and held there, while removing water, until an alcoholic acid number of 45.3 was obtained. The contents of the flask were cooled to 180° C. and 160.0g of adipic acid were added. The reaction mixture was heated to 235° C. and held there, while removing water, until an alcoholic acid number of 72.5 was obtained. The contents of the flask were cooled to 150° C. and 30.0g of xylene were added. A Dean-Stark trap was placed at the top of the packed column and the contents of the flask returned to 230° C. This temperature was maintained, while removing water, until an alcoholic acid number of 58.5 was obtained. The contents of the flask were cooled to 150° C. and 26.0g of n-butylglycidyl ether and 2.5g of tri-n-butylamine were added. The reaction mixture was held at 150° C. for 1.5 hours. The polyester was reduced to with n-butanol to afford a material with a Gardner-Holdt viscosity of Z at 74.2% NVM (2 hrs. at 150° C) and an alcoholic acid number of 44.9 (on % NVM). A portion of said polyester, i.e., 675.0g, was reduced with 32.2g of N,N-Dimethylethanolamine and 294.5g of distilled water to afford a clear solution having a Gardner-Holdt viscosity of Z at 50.7% NVM (2 hrs. at 150° C) and a pH of 7.3.

EXAMPLE 3

The polyester solution from Example 1 was made up as a coating by adding 15%, based on resin solids, of hexamethoxymethylmelamine (Cymel 303, American Cyanamid Company) as a cross-linker and 0.87%, based on resin solids, of a 20% solution of p-toluene sulfonic acid (Catalyst 1010, manufactured by American Cyanamid Company) as a catalyst. This vehicle was pigmented with $TiO_2$ (Ti-Pure R-960, E. I. duPont de Nemours and Co.) at a pigment to binder ratio of 1/1 and reduced to 48% non-volatile with deionized water. The final coating had a viscosity of 800 cps, a pH of 7.5, and the final solvent composition was approximately 84% water by weight.

This coating was applied to 20 mil cold rolled steel treated with Bonderite 901 at a dry film thickness of 0.85 mils and baked at 510° F. for 40 seconds (peak metal temperature of 430° F).

The coated panel showed the following physical properties: Knoop Hardness Number of 8.9; Pencil Hardness of F to H; 60° Gloss of 85; Passed more than 100 double rubs with a cloth saturated with methyl ethyl ketone; Passed fabrication plus Scotch tape adhesion on a 2 T-Bend (coated panel bent 180° over two thickness of the original substrate) and 160 inch-lb. reverse impact with a ½ inch ball; Passed a "dry heat" test of 200° F. for 10 minutes on a 3 T-Bend without cracking open.

What is claimed is:

1. In a process for coil-coating metals, which process comprises feeding a sheet of metal to a coating zone wherein a fluid coating composition comprising a linear polyester resin and a substantially water-free solvent is applied, passing the fluid coated metal to a drying zone wherein said substantially water-free solvent is evaporated thereby depositing a dried, uncured coating on the metal, passing said dried, uncured coated metal to an oven wherein said dried, uncured coating is cured, and withdrawing said cured coated metal from said oven, the improvement, whereby minimizing the atmospheric pollution and fire-hazard associated with a substantially water-free solvent, which comprises: applying, in said coating zone, a fluid coating composition comprising a linear polyester resin terminated with a major fraction of carboxyl groups and a minor fraction of carboxyl esters of a hydrocarbyl glycidyl ether, said resin being dissolved in an aqueous solvent at least 50 percent of which is water.

2. The process described in claim 1 wherein said hydrocarbyl glycidyl ether is phenyl glycidyl ether, and said minor fraction of carboxyl esters of said phenyl glycidyl ether is sufficiently large to provide a curing time of less than 2 minutes at a temperature of 375° F. to 475° F.

3. The process described in claim 1 wherein said hydrocarbyl glycidyl ether is n-butyl glycidyl ether, and said minor fraction of said n-butyl glycidyl ether is sufficiently large to provide a curing time of less than two minutes at a metal temperature of 375° F. to 475° F.

* * * * *